United States Patent [19]

Aberson, Jr. et al.

[11] Patent Number: 4,691,986

[45] Date of Patent: Sep. 8, 1987

[54] ALIGNED PLUG OPTICAL FIBER CONNECTOR WITH "CONTIGUOUS" PLUGS, AND METHOD FOR USING SAME

[75] Inventors: James A. Aberson, Jr., Atlanta; George F. DeVeau, Jr., Stone Mountain; Terry D. Mathis, Lilburn; Calvin M. Miller, Roswell, all of Ga.

[73] Assignee: American Telephone and Telegraph Company, AT&T Bell Laboratories, Murray Hill, N.J.

[21] Appl. No.: 795,483

[22] Filed: Nov. 6, 1985

[51] Int. Cl.$^4$ ................................................ G02B 6/38
[52] U.S. Cl. ................................ 350/96.21; 350/96.20
[58] Field of Search ............... 350/96.18, 96.20, 96.21, 350/96.22

[56] References Cited

U.S. PATENT DOCUMENTS

| | | | |
|---|---|---|---|
| 4,178,067 | 12/1979 | Johnson et al. | 350/96.21 |
| 4,353,620 | 10/1982 | Schultz | 350/96.21 |
| 4,593,971 | 6/1986 | Clement et al. | 350/96.20 |

FOREIGN PATENT DOCUMENTS 0113562 10/1978 Japan ................................. 350/96.21

OTHER PUBLICATIONS

*Proceedings of the Optical Fiber Conference*, Los Angeles, Sep. 1982, pp. 165–170.

*Primary Examiner*—Eugene R. LaRoche
*Assistant Examiner*—James C. Lee
*Attorney, Agent, or Firm*—Eugen E. Pacher

[57] ABSTRACT

In a plug-type optical fiber connector low loss can be achieved, without any active alignment of the fiber cores, if the two cylindrical plugs used in the connector are "contiguous" plugs, i.e., derived from contiguous segments of the tubular stock from which the plugs are produced, and if the plugs are arranged such that the "contiguous" ends of the plugs are the mating ends, and such that the rotational relationship between the plugs is substantially the one that existed prior to sectioning. The inventive connector comprises two contiguous plugs and includes features that permit identification of the contiguous ends and of the rotational relationship. In a preferred embodiment, the tubular stock is drawn glass stock, the two contiguous segments are left joined but scored circumferentially to permit easy separation in the field, with a longitudinal groove in the outer cylinder surface of the contiguous segments identifying the original rotational relationship. The plugs are to be inserted into an alignment sleeve, or into, e.g., three-rod alignment means. Disclosed is also a novel corrugated tube alignment sleeve that has general applicability in plug and sleeve-type connectors.

25 Claims, 10 Drawing Figures

FIG. 5
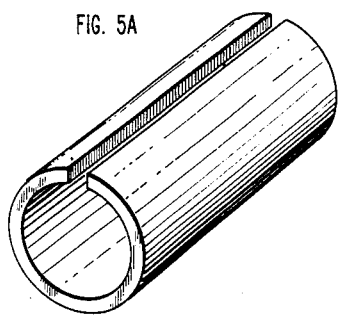
FIG. 5A
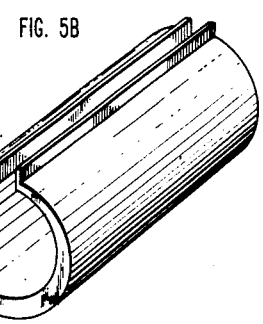
FIG. 5B
FIG. 6
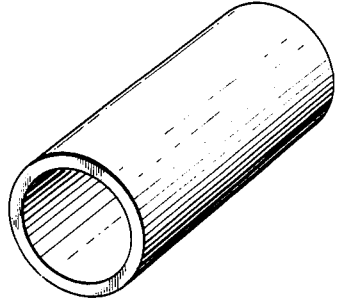
FIG. 6A
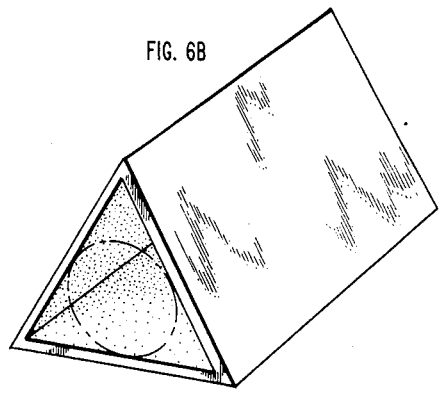
FIG. 6B
FIG. 7
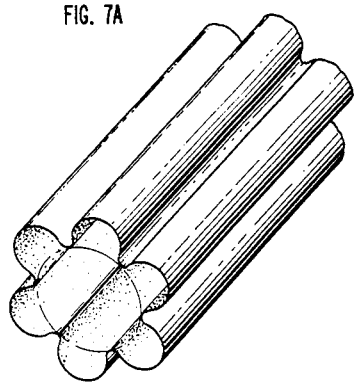
FIG. 7A
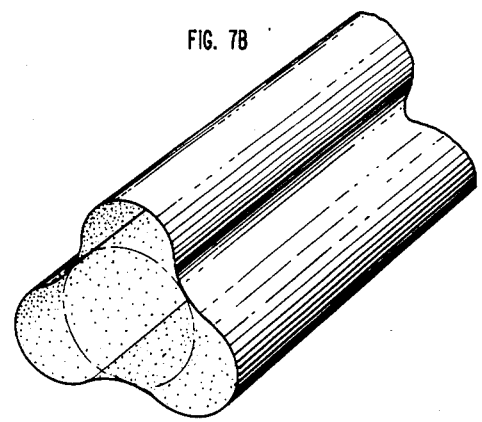
FIG. 7B

ALIGNED PLUG OPTICAL FIBER CONNECTOR WITH "CONTIGUOUS" PLUGS, AND METHOD FOR USING SAME

FIELD OF THE INVENTION

This invention pertains to means for end-to-end connecting optical fibers, to methods for making such a connection, and to optical fiber communication systems comprising fibers connected by such means.

BACKGROUND OF THE INVENTION

Optical fiber connectors and splices (hereinafter referred to collectively as "connectors") are an essential part of substantially any optical fiber communication system. For instance, connectors may be used to join segments of fiber into longer lengths, or to connect fiber to active devices such as radiation sources, detectors, or repeaters, or to passive devices such as switches or attenuators.

The task of an optical fiber connector is twofold. First, it must couple or join two optical fibers with minimum insertion loss. Second, it must provide mechanical stability and protection to the junction in its working environment. Achieving low insertion loss in coupling two fibers is generally a function of the alignment of the fiber ends, the width of the gap between the ends, and the optical surface condition of the ends. Stability and junction protection is generally a function of connector design, e.g., minimization of differential thermal expansion effects.

The prior art knows many approaches to achieving fiber alignment. Among them are V-grooves, three-rod containment, resilient ferrules, elastomeric bushings, jewel bushings, conical nose/conical bushing, and precision ferrule/precision bushing devices. A discussion of some prior art connectors can be found, for instance, in R. Schultz, *Proceedings of the Optical Fiber Conference,* Los Angeles (September 1982), pp. 165-170.

Prior art optical fiber connectors often contain one or more precision-machined parts and are therefore relatively costly items. Whereas this may be acceptable for some applications, e.g., in trunk lines, in other cases the bost of such prior art connectors might constitute a significant fraction of the total installation cost. Thus, strong incentives exist for devising optical fiber connectors that do not require expensive precision-machined parts.

A further and very important consideration in connector design is the relative ease of field installation of the connector, since a complicated and lengthy installation procedure may significantly affect the installed cost of a multiconnector optical fiber network. It is thus desirable that installation of a connector not only be accomplishable within a relatively short period of time, but also that the installation not require special skills or manipulations not easily carried out in the field.

Ideally, an optical fiber connector would be a low-cost item not comprising precision-machined parts, be easily and quickly installable in the field in a process that requires participation of only one installer, that does not require the use of special alignment or detection equipment, that yields connections of very low loss that are insensitive to environmental effects such as temperature changes, and that is rugged and usable in a variety of environments. To the best of our knowledge, no connector exists that meets this wish list.

A prior art connector that does not use precision-machined parts and which has many of the abovelisted desirable features is disclosed in coassigned U.S. patent application Ser. No. 527,341, incorporated herein by reference. This prior art connector uses two drawn glass tubular plugs, with the fiber inserted into the bore of the plug, and the connection between the two fiber ends made by inserting the plugs in end-to-end fashion into an alignment sleeve that maintains the outer surfaces of the two plugs in registry. This connector design relies on the fact that the plugs can be produced to very close tolerances by drawing from a glass preform.

A further prior art connector that has many of the above-listed desirable characteristics is disclosed in coassigned U.S. Pat. No. 4,545,644 also incorporated herein by reference. That application discloses an optical fiber connector comprising two cylindrical plugs with axial bores into which the respective fiber ends are inserted, with the plugs then inserted into a housing. The housing comprises a multiplicity, typically three, of basically cylindrical alignment rods, and means for maintaining the alignment rods in contacting relationship with both plugs. A simple spring clip is an example of such means. At least one of the alignment rods carries a "flat", i.e., a region, extending from one of the ends of the rod towards the middle, where a small amount of rod material has been removed such as to create a small offset. One or more flat-carrying alignment rods can be used to deliberately introduce an eccentricity into the plug alignment, yielding the potential to eliminate, by rotation of one plug with respect to the other, any misalignment between the fiber cores that is due to such unavoidable eccentricities as that of the fiber core with respect to the fiber surface, of the fiber with respect to the bore of the plug, or of the bore of the plug with respect to the plug cylinder surface.

In this application we are also disclosing a connector which has many of the above-listed desirable characteristics. In particular, the inventive connector does not contain precision-machined parts, can be quickly and easily installed by one installer without requiring the assistance of further personnel in the central office, and without the need for special tools or alignment fixtures, and, in many cases, even without the use of local detection apparatus, and is temperature stable and versatile. Furthermore, the connector can consistently yield low-loss connections and, if desired, can be fine tuned to produce very low-loss connections in single mode fiber, of the order of 0.1 dB or less.

Definitions

A "plug" herein is a tubular member, typically a right circular hollow cylinder, adapted for receiving in its bore (which is substantially concentric with the outer cylinder surface of the plug) the end portion of an optical fiber. The "end face" of the plug is that plane surface which, in an assembled connector, faces the mating plug. Plugs are produced by a process comprising sectioning of tubular stock. A length of tubular stock which will be transformed (by sectioning, and possibly some other operations such as bevelling of an edge, marking, etc.) into a plug is to be referred to as a "segment". It will be understood that first and second plugs are always produced from first and second segments, respectively.

A first and a second plug are "contiguous" plugs if the first and a second segment of tubular stock were contiguous segments of the tubular stock.

The "contiguous" face of a first contiguous plug is that surface which resulted when a first and a second contiguous segment were separated from each other, thereby producing the first (and a second) contiguous plug.

By the "rotational relationship" between contiguous first and second plugs (aligned such that their longitudinal axes are substantially collinear and that their contiguous faces are opposed) we mean the relationship between the plugs relative to rotation about their common axis.

BRIEF DESCRIPTION OF THE DRAWING

FIGS. 5A and B show split alignment sleeves with uniform and non-uniform wall thickness, respectively;

FIGS. 6A and B show a rigid and a compliant continuous alignment sleeve, respectively; and FIGS. 7A and B show a six-line corrugated tube alignment sleeve and a cloverleaf alignment tube, respectively.

THE INVENTION

The inventive connector comprises two contiguous plugs as defined above, which are manufactured by a process that comprises dividing a length of tubular stock into a multiplicity of segments, each segment corresponding to a plug. Into the bore of each plug a bare fiber is to be inserted and maintained therein, typically by adhesive means. The plugs are then inserted (in end-to-end fashion, with contiguous faces opposed) into means for maintaining the plug outer cylinder surfaces in registry with each other. Provided are a feature (or features) that permit indentification of the contiguous faces, and a feature (or features) that permit identification of the rotational relationship between the plugs, such that the plugs can be assembled in their preseparation relative position.

Basic to the instant invention is the recognition that the unavoidable eccentricity between plug bore and plug cylinder surface will have essentially no effect on fiber alignment if the two plugs have essentially the same amount of bore eccentricity relative to the cylinder surface, and if the plugs are aligned such that the eccentricities are in the same direction. This situation can be achieved with contiguous plugs if the plugs are arranged such that the contiguous faces are the end faces, and if they are rotationally aligned so that the plugs have substantially the angular relationship that existed between the two contiguous segments prior to their sectioning.

In one, currently preferred, embodiment of the invention, the plugs are contacted by a multiplicity, typically three, cylindrical alignment rods which are maintained in contact with the plugs by appropriate means, e.g., a spring clip. In this embodiment, the geometry of the connector thus resembles that of the prior art connector disclosed in the above-referred to U.S. Pat. No. 4,545,644. However, it is to be noted that in the instant embodiment of the inventive connector, flats are not required.

In another embodiment, the means for maintaining the plugs in registry comprise a sleeve that contactingly surrounds both plugs. In this embodiment, the geometry of the inventive connector thus resembles the geometry of the prior art connector disclosed in U.S. patent application Ser. No. 527,341.

Figure 1:
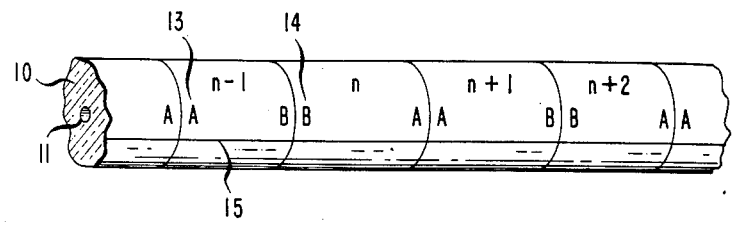
FIG. 1 schematically depicts a length of tubular stock comprising several segments.

FIG. 1 shows a portion 10 of tubular stock with bore 11. A multiplicity of segments (labelled n−1, n, n+1, . . . ) are indicated by means of circumferential lines. It will be understood that such lines typically will not be present on actual tubular stock. Numbering the segments, as exemplified in FIG. 1, is one means for identifying contiguous plugs. Many other ways for achieving this end (e.g., color coding, segregating pairs of contiguous plugs) will be apparent to those skilled in the art, and all such means are considered to be within the scope of the invention.

FIG. 1 also shows markings (A and B) by which the contiguous plug faces can later be identified. Again, many other ways for achieving this end are known, and all such means (including color coding, numbering, insertion of one end of the plug into a holder, etc.) are considered to be within the scope of the invention. FIG. 1 also shows exemplary means for identifying the angular relationship between contiguous plugs, namely, a continuous line 15 that runs parallel to the axis of the tubular stock. Again, it will be understood that the indicated line is exemplary only and that any means for identifying the angular relationship between contiguous plugs is contemplated. For instance, line 15 need not extend the length of several segments. Instead, the angular relationship between a contiguous pair of segments can be identified by means of a short line that crosses the boundary between the segments. Such a line also serves to identify the contiguous ends of contiguous plugs. From this discussion it is evident that the desired end can be achieved in a variety of ways, all of which are considered to be within the scope of the invention.

Although in the currently preferred embodiment of the invention the plugs are drawn glass plugs, the invention is not so limited, and plugs may be made from any appropriate material, including ceramics, plastics, and metal, or may be glass parts shaped by processes other than drawing. The choice of plug material and manufacturing method will substantially depend on economic and systems considerations. The latter, for instance, may include the acceptable loss per connector and/or the temperature range of systems operation.

Even though in connectors according to the invention the effect of a major unavoidable eccentricity is eliminated by the restoration of the plugs to the presectioning rotational relationship, several other, albeit typically small, unavoidable eccentricities remain. Among these are the eccentricity of the fiber core with respect to the fiber surface, and the eccentricity of the fiber within the bore of the plug. The latter can be minimized by making the bore as small as possible. For instance, we have found that, for commercially available single mode optical fiber of nominal diameter 126 $\mu$m, a bore size of 126 to 128 $\mu$m can advantageously be used. In general, we currently believe that the bore diameter should preferably not exceed the fiber diameter by more than about 5 $\mu$m, preferably by not more than 3 $\mu$m. The bore diameter of course has to be larger, exemplarily by at least 1 $\mu$m, than the fiber diameter.

In many cases, the fiber will be maintained in the bore by adhesive means. Thus, during installation of a connector, a relatively viscous fluid frequently fills the space between fiber and the wall of the bore. Such a liquid appears to exert a centering effect on the fiber, thus often helping to reduce the eccentricity of the fiber in the bore.

Figure 2:
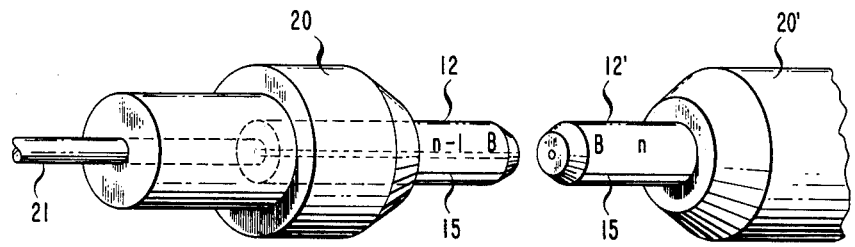
FIG. 2 schematically shows some parts of a connector according to the invention.

FIG. 2 shows an exemplary connector according to the invention in an intermediate stage of assembly. A plug 12 is inserted into housing 20 (typically a molded plastic part) such that a portion of the plug, including the end labeled "B", protrudes from the housing. The plug is maintained in the housing by any appropriate means, including adhesive means or by means of a press fit. The housing has an axial bore of diameter slightly larger than the outside diameter of coated fiber 21. The coating is removed from an end portion of coated fiber 21, and the bare fiber portion threaded through the bore of the housing and the bore of plug 12, with the fiber typically inserted into the assembly such that the coated fiber portion extends into the bore of the housing, preferably with the coating contacting the plug. The fiber is then secured in the assembly by any appropriate means, typically by means of an adhesive, preferably a UV-curable adhesive, the fiber protruding from the plug end face scribed and broken by known means and the fiber and plug end face polished, also by known means. The second assembly is prepared as described, care being exercised to assure that the plugs are contiguous plugs. This is indicated in FIG. 2 by the labels on the plugs, the left-hand plug being labeled "n−1" and the right-hand plug being labeled "n". Similarly, care is taken during preparation of two assemblies that the end face of each plug is its contiguous face. This, too, is indicated in FIG. 2 by means of markings on the plugs. In particular, both protruding plug ends are labeled "B". Assuming that the plugs of FIG. 2 derive from the portion of tubular stock shown in FIG. 1, it can be seen that the plugs of FIG. 2 have the required relationship. Shown are also longitudinal lines 15 which permit rotational alignment of the plugs.

Figure 3:
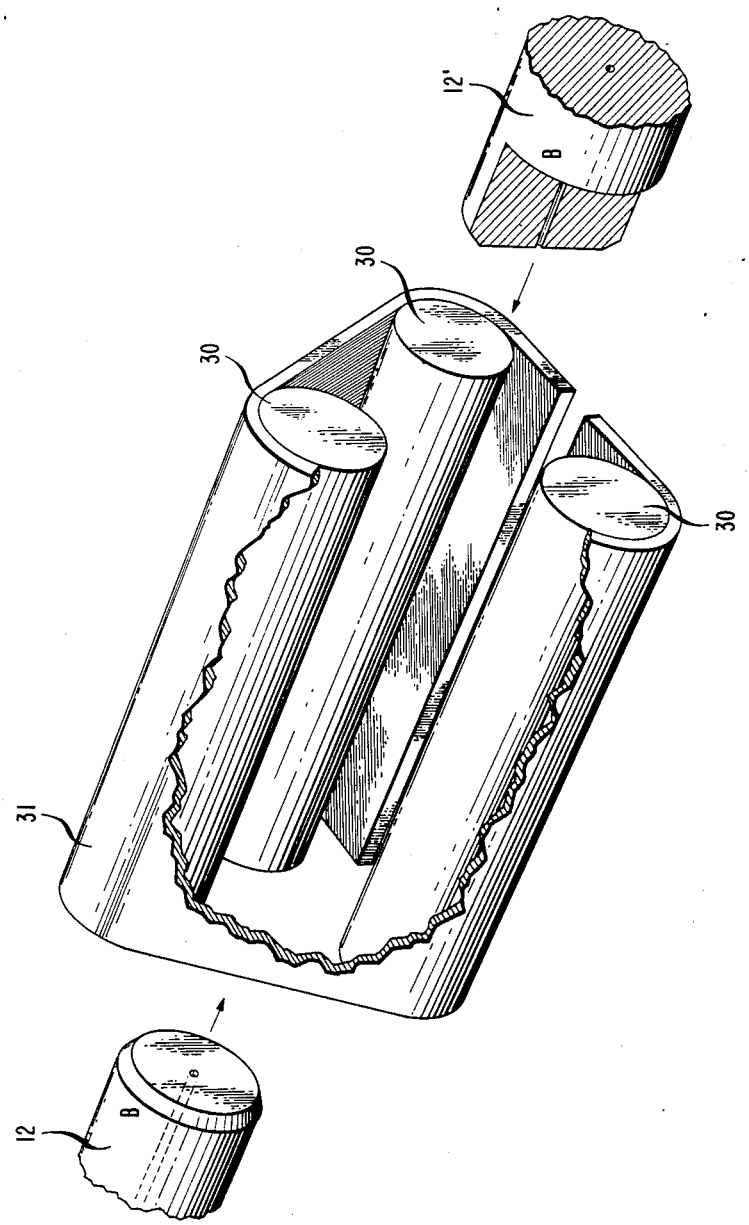
FIG. 3 schematically shows three-rod alignment means useful in the practice of the invention.

The fiber connection is completed by inserting the two plugs into appropriate alignment means, e.g., into a split cylindrical sleeve, into a continuous shell sleeve (either rigid or compliant), or into alignment means comprising a multiplicity of clyindrical alignment bodies (typically rods, but not excluding tubular bodies) and rotational aligning of the plugs to restore them to the presectioning relationship. Multi-rod alignment means are the means currently preferred by us for single mode fiber exemplary means, and are illustrated in FIG. 3. Three cylindrical alignment rods 30 are held within flexible clip 31 such that the rods contact plugs 12 and 12′ after their insertion into the alignment means. For reasons of thermal stability it is frequently desirable that the alignment rods have substantially the same coefficient of thermal expansion as the plugs. This of course is the case if alignment rods and plugs consist of the same material, e.g., glass, and this is currently preferred.

Connectors according to the invention typically also comprise means for maintaining a constant axial relationship between the fiber ends after the insertion of the plugs into the alignment means. Many means for achieving this are known to those skilled in the art. A very simple yet effective one is illustrated, for instance, in FIGS. 3 and 4 of U.S. patent application Ser. No. 527,341, namely spring clip 31. It will be understood that the plug end faces can be in contacting relationship with each other or that an index-matching material can be present between them. By index-matching material we mean any material that decreases unwanted reflections from the fiber end faces due to refractive index mismatch.

Figure 4:
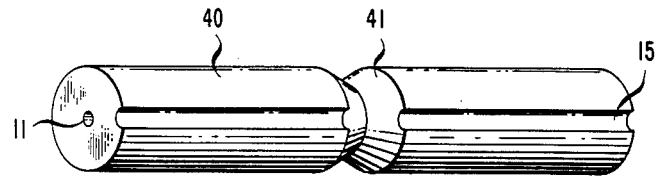
FIG. 4 shows a two-segment portion of tubular stock prior to separation.

As mentioned above, any means or feature for assuring that a connector comprises a set of contiguous plugs, with the plugs oriented such that the contiguous faces are in mating position, is contemplated to be within the scope of the invention. A particularly reliable, and currently preferred, means for achieving these ends is the following. During manufacture of the plugs, portions of tubular stock consisting of two segments are produced, and means for later separating the segments such that two plugs of the correct length result are also provided. FIG. 4 shows tubular stock portion 40 with axial bore 11 therethrough, and with circumferential scoring 41 which permits breaking of the portion such that two plugs of the correct length result. As will be obvious to those skilled in the art, the indicated technique for separating 40 into two halves will be most effective if the plug material is relatively brittle, e.g., glass or ceramic.

It is also possible to mount two housings (of the type depicted in FIG. 2) onto tubular stock portion 40 during manufacture of the connector parts. This prevents any error in identifying the contiguous plug faces after separation of the contiguous elements of 40. If each housing has a tab or other feature that permits identification of the rotational position, and if the two housing are mounted onto the tubular stock such that the tabs (or other features) are in a predetermined mutual relationship, typically aligned, then, after separation of the contiguous plugs, the plugs are rotationally aligned if the tabs (or other features) are in the pre-separation relationship.

FIG. 4 also shows exemplary means for identifying the angular relationship between the contiguous plugs, namely, narrow groove 15. The groove, which is parallel to the axis of the segments and which is produced by known means, makes it possible to rotationally align the plugs without requiring visual observation. For instance, in a connector that uses alignment rods of the type shown in FIG. 3 it is possible to achieve angular alignment by positioning the first plug such that one of the alignment rods contacts the first plug along groove 15, and by rotating the second plug until the same alignment rod contacts the second plug along its groove. Attainment of this second plug position is frequently signaled by a click that can be felt by the installer. Furthermore, in the aligned position both plugs offer some resistance to rotation, thereby giving protection against accidental misalignment.

It will be understood that use of the alignment groove is not restricted to undivided contiguous plugs. It the plugs are made from glass stock drawn from a tubular preform then it is advantageous to groove the preform (e.g., by grinding). It will also be understood that there are many ways of identifying the original angular relationship between contiguous plugs, and all are intended to be within the scope of the invention. For instance, a longitudinal line can be produced on the surface of the tubular stock by scribing, or by means of paint or ink, colored material (including ink) can be imbedded in a longitudinal groove, or the appearance of a longitudinal strip of the tubular stock surface can be changed, e.g., by ion exchange.

Even though alignment means of the type depicted in FIG. 3 are currently preferred by us (at least for single mode fiber connectors), other alignment means can be used in inventive connectors. FIGS. 5 and 6 show exemplary alignment sleeves, namely, uniform and nonuniform wall thickness split sleeves in FIGS. 5A and 5B, respectively, and rigid and compliant shell continuous sleeves in FIGS. 6A and 6B, respectively.

We have found that compliant shell continuous sleeves of novel design can be advantageously used with many "plug and sleeve" type fiber connectors, including the inventive connector. The novel sleeves are longitudinally corrugated tubular members designed to make contact with the plugs along "lines" that are parallel to the plug axis.

We will refer to such sleeves as "corrugated tube" sleeves, and to a corrugated tube sleeve with three lines of contact with the plugs as a "cloverleaf" sleeve. The latter is the currently preferred embodiment of the novel sleeve. Examples of two corrugated tube sleeves are shown in FIGS. 7A and 7B, with the former having 6 lines of contact with the plugs, and the latter being a cloverleaf sleeve.

Corrugated tube sleeves are advantageously made from tubular metal stock, for instance, from Be-Cu tubing drawn through an appropriately shaped die or dies. The sleeves thus lend themselves to mass production, and consequently can be produced very economically. More importantly, corrugated tube sleeves have functional advantages that are typically not all found in a given prior art sleeve. In particular, such sleeves are selfcentering, due to the symmetry of the forces applied to the plugs. Furthermore, such sleeves are relatively compliant with regard to radial deformations, and thus can accommodate a range of plug sizes, as well as pairs of plugs that are not of exactly equal diameter. Lastly, the sleeve does not require application of external clamping forces as does, for instance, the prior art sleeve disclosed in U.S. Pat. No. 4,353,620.

As will be readily understood by those skilled in the art, sleeves of the corrugated tube type can be used in simplex, duplex, and even higher fiber count plug-and-sleeve fiber connectors, as well as in plug-and-sleeve connectors for coupling a fiber to an optical transmitter, repeater, receiver, or other component of an optical fiber communications system.

Installation of a connector according to the invention typically comprises stripping the coating from the ends of the two fibers to be connected, inserting the fiber ends into plug assemblies of the type shown in FIG. 2, scoring and breaking the fiber that protrudes from the plug end face, and polishing the fiber end. This is followed by insertion of the plugs into appropriate alignment means, e.g., means of the type shown in FIG. 3, possibly causing an appropriate index-matching material to be present between the fiber ends, adjusting the rotational relationship of the two plugs such that the two plugs are in the pre-separation rotational relationship, and providing means for maintaining the relative axial relationship between the plug end faces. Following this procedure typically results in low loss connections. For instance, when connecting commercially available single mode fiber (core diameter about 8.5 $\mu$m, fiber diameter about 125 $\mu$m) with inventive connectors that comprised drawn glass plugs (2.5 mm diameter, 12.5 mm long, bore diameter 126–128 $\mu$m) and three-rod alignment of the type depicted in FIG. 3, we consistently produced connections having average loss of 0.3 dB or less. It will be noticed that the above described procedure does not require the use of any instrument, e.g., to measure the loss of the connection.

The above method is satisfactory in many circumstances. If, however, an even lower loss conection is desired then the remaining eccentricities of the connection can typically be cancelled or reduced by slightly rotating one plug relative to the other. In order to find the position of minimum loss, appropriate measurements have to be made (e.g., determination of minimum in the lost optical power by means of a local measurement, or determination of the maximum in the transmitted power by means of a measurement at a remote site), and thus some of the simplicity of the procedure is lost, in return for some reduction in loss.

EXAMPLE 1

Tubular borosilicate glass stock (outside diameter 2.5 mm, inside diameter 128 $\mu$m) was produced by drawing of a longitudinally grooved preform (outside diameter 3.8 cm). The stock was partitioned into 2.5 cm long sections, each section scribed circumferentially so as to define two contiguous segments of equal length, and each end of each section inserted into a molded plastic housing of the type depicted in FIG. 2.

Two lengths of commercially available single mode optical fiber (125 $\mu$m outside diameter, 8.5 $\mu$m core diameter, dual polymer coating) were prepared for connecting by removing the coating from an about 1 inch long end portion of each fiber. After manually breaking one of the sections of tubular stock along the scoring, a small quantity of UV-curable adhesive was injected into the bore of the housing attached to one of the thus created two contiguous plugs, a fiber was then inserted into the bore of the housing, and urged forward until the stripped fiber portion protruded from the plug end face and the coating contacted the plug. The second fiber was similarly prepared, and both plugs were then exposed to actinic radiation, resulting in adhesive fixation of the fibers in the respective plugs. After scribing, breaking, and polishing of the fiber by known means a small quantity of index-matching silicone was placed onto the end face of one of the plugs, and the plugs were inserted into three-rod alignment means of the type shown in FIG. 3. The rods were borosilicate glass (2.0 mm OD, 100 mm long), the spring clip was beryllium copper. After insertion both plugs were rotated until one and the same alignment rod rested in the groove in both plugs. In this position the contiguous plugs were essentially in the pre-separation relationship with respect to each other. After application of a spring clip of the type shown in FIG. 3 of U.S. patent application Ser. No. 527,341, the connector loss was determined and found to be about 0.3 dB at 1.3 $\mu$m.

EXAMPLE 2

Two lengths of multimode optical fiber were connected by means of a connector substantially as depicted in FIG. 4 of U.S. patent application Ser. No. 527,341, with a cloverleaf sleeve of the type shown in FIG. 7B herein replacing sleeve 30. The cloverleaf sleeve was made from phosphor bronze stock, had an internal diameter of about 2.47 mm (0.0970–0.0975 inches), and a length of about 10 mm. The loss was about 0.6 dB at 1.3 $\mu$m.

What is claimed is:
1. Optical fiber connector comprising
   (a) a first and a second tubular member, to be referred to as the first and the second plug, respectively, each plug having an outer cylinder surface, an axis, a bore that is substantially concentric with the outer cylinder surface, and an end face, an end portion of an optical fiber to be inserted into the bore of each of the plugs and to be maintained therein fixed relative to the plug;

(b) first means for maintaining the outer cylinder surface of the first plug essentially concentric with the outer cylinder surface of the second plug, with the first plug end face facing the second plug end face; and (c) second means for maintaining the first plug in essentially fixed axial relationship with the second plug;

CHARACTERIZED IN THAT (d) the first and second plugs are contiguous plugs, where by "contiguous plugs" we mean herein plugs fabricated by a process that comprises:

providing a length of tubular stock comprising a multiplicity of segments, a "segment" being a portion of the tubular stock which is to be transformed, by a process comprising separating two contiguous segments, into a plug, a first and a second contiguous segment to be transformed into the first and second contiguous plugs, respectively, the two surfaces that result when two contiguous segments are separated to be termed the "contiguous" faces of the resulting plugs; and further CHARACTERIZED IN THAT the connector comprises:

(e) a feature or features that permit idenfitication of the contiguous face of the first and of the second plug, respectively, with the first and second plugs to be oriented such that the contiguous faces are the end faces; and (f) a feature or features that permit identification of that rotational relationship between the first and the second plug which corresponds to the rotational relationship that existed between the first and the second segment prior to their separation.

2. Connector of claim 1, wherein the tubular stock is drawn glass tubular stock.

3. Connector of claim 1, wherein the optical fiber has diameter d, and the bore of the first and of the second plug each have a diameter within the range (d+1 μm) to (d+5 μm).

4. Connector of claim 1, wherein the first means comprise a multiplicity of cylindrical bodies, and means for maintaining the cylindrical bodies in contacting relationship with both the first and the second plug.

5. Connector of claim 4, wherein the cylindrical bodies have a thermal expansion coefficient that is substantially equal to the thermal expansion coefficient of the plugs.

6. Connector of claim 5, wherein the tubular stock is drawn glass tubular stock, and the cylindrical bodies are glass rods.

7. Connector of claim 1, wherein the first means comprise an alignment sleeve which contacts both the first and the second plug outer cylinder surfaces.

8. Connector of claim 7, wherein the alignment sleeve is a corrugated tube adapted for contacting the plug outer surfaces along at least three lines, each of which is essentially parallel to the axis of the plugs.

9. Connector of claim 8, wherein the corrugated tube alignment sleeve is adapted for contacting the plug outer surfaces along three lines that are substantially regularly spaced around the plug outer cylinder surfaces.

10. Connector of claim 8, wherein the corrugated tube alignment sleeve is a drawn metal alignment sleeve produced by a process comprising drawing a metal tube of circular cross section through a die of noncircular cross section.

11. Connector of claim 1, wherein each plug is inserted into a housing, the housing having an axial bore adapted for receiving therein a portion of coated optical fiber.

12. Connector of claim 1, wherein the first and section segments are adapted for being separated during connector installation.

13. Connector of claim 12, wherein the tubular stock is drawn glass tubular stock, and wherein the first and second segments can be separated by breaking of the tubular stock.

14. Connector of claim 12, wherein to each of the two ends of the length of tubular stock is attached a housing adapted for inserting an optical fiber therethrough.

15. Connector of claim 11, wherein at least a portion of the length of tubular stock including the first and second segments comprises a longitudinal groove in its outer cylinder surface, the groove being the feature that permits identification of the rotational relationship of the first and second plugs.

16. Connector of claim 14, wherein each housing comprises a feature according to section (f) of claim 1.

17. Connector of claim 1, in combination with a first and a second optical fiber to be joined in an optical signal transmissive end-to-end relationship, an end portion of the first and the second fiber maintained in the bore of the first and the second plug, respectively, with the fiber end essentially flush with the end face of the respective plug, with the plugs maintained such that the outer cylinder surface of the first plug is essentially concentric with the outer cylinder surface of the second plug, with the plug end faces opposed, and such that the first plug is in essentially fixed axial relationship with the second plug, with the first and second plugs being contiguous plugs, with the first and second plug end faces being contiguous faces, and with the rotational relationship between the first and the second plug substantially corresponding to the rotational relationship that existed between the first and the second segment prior to their being separated.

18. The combination of claim 17, wherein the first and second plugs are drawn glass plugs, and wherein the first means comprise at least three cylindrical glass bodies and means for maintaining the cylindrical glass bodies in contacting relationship with both the first and the second plug.

19. The combination of claim 17, wherein a refractive index-matching material is present between the end faces.

20. The combination of claim 17, wherein the end faces are in contacting relationship.

21. Method for end-to-end joining a first optical fiber to a second optical fiber, the method comprising (a) providing a first and a second tubular member, to be referred to as the first and the second plug, respectively, each plug having an outer cylinder surface, an axis, a bore that is substantially concentric with the outer cylinder surface, and an end face;

(b) inserting an end portion of the first optical fiber and an end portion of the second optical fiber into the bore of the first plug and the bore of the second plug, respectively, such that the end portion of each fiber extends at least to the end face of the respective plug, fixing each fiber with respect to the respective plug, and causing the end of each fiber to be essentially flush with the end face of the respective plug;

(c) inserting the first and second plugs into first means for maintaining the outer cylinder surface of the first plug essentially concentric with the outer cylinder surface of the second plug, with the first plug end face facing the second plug end face;

(d) providing second means for maintaining the first plug in essentially fixed axial relationship with the second plug;

CHARACTERIZED IN THAT (e) the first and second plugs were produced by a process comprising providing a length of tubular stock comprising a multiplicity of segments, a "segment" being a portion of the tubular stock which is to be transformed, by a process comprising separating contiguous segments, into a plug, a first and a second segment to be transformed into the first and second plugs, respectively, the first segment being contiguous with the second segment, the two plugs that result when two contiguous segments are transformed into plugs to be termed "contiguous" plugs, the two surfaces that result when two contiguous segments are separated to be termed the "contiguous" faces of the resulting plugs; and (f) the end faces of the first and second plug are the contiguous faces; and the method further comprises (g) causing the first and second plugs to be in substantially that rotational relationship which corresponds to the rotational relationship that existed between the first and the second segment prior to their being separated.

22. Method of claim 21, comprising the further steps of (i) rotating, subsequent to carrying out step (g) of claim 21, the first plug relative to the second plug; and (ii) monitoring the optical transmission loss due to the connector.

23. Method of claim 21, wherein step (a) of claim 21 comprises separating the first segment from the second segment, thereby forming the firs and second plugs, respectively.

24. Optical fiber connector comprising (a) a first and a second tubular member, to be referred to as the first and the second plug, respectively, each plug having an outer cylinder surface, an axis, a bore that is substantially concentric with the outer cylinder surface, and an end face, an end portion of an optical fiber to be inserted into the bore of each of the plugs and to be maintained therein fixed relative to the plug;

(b) first means for maintaining the outer cylinder surface of the first plug essentially concentric with the outer cylinder surface of the second plug, with the first plug end face facing the second plug end face; and (c) second means for maintaining the first plug in essentially fixed axial relationship with the second plug;

CHARACTERIZED IN THAT the first means comprise a corrugated tube alignment sleeve which contacts both the first and the second plug outer cylinder surfaces along at least three lines, each of the lines being essentially parallel to the plug axis.

25. Connector of claim 24 in combination with a first and a second optical fiber to be joined in an optical signal transmissive end-to-end connection, an end portion of the first and the second fiber maintained in the bore of the first and the second plug, respectively, with the fiber end essentially flush with the end face of the respective plug, with the plugs maintained by the corrugated tube alignment sleeve such that the outer cylinder surface of the first plug is essentially concentric with the outer cylinder surface of the second plug, with the plug end faces opposed, and by the second means such that the first plug is in essentially fixed axial relationship with the second plug.

* * * * *